United States Patent [19]

Boudreau

[11] 4,453,093

[45] Jun. 5, 1984

[54] MULTIPLE COMPARISON CIRCUITRY FOR PROVIDING A SOFTWARE ERROR TRACE SIGNAL

[75] Inventor: Daniel A. Boudreau, Billerica, Mass.

[73] Assignee: Honeywell Information Systems Inc., Waltham, Mass.

[21] Appl. No.: 364,587

[22] Filed: Apr. 2, 1982

[51] Int. Cl.³ .................... H03K 5/24; H03K 19/20
[52] U.S. Cl. ................................ 307/440; 307/355; 371/16
[58] Field of Search ............... 371/17, 68; 307/440, 307/445, 350, 272 R, 355; 328/119, 158; 340/661

[56] References Cited

U.S. PATENT DOCUMENTS

| | | | |
|---|---|---|---|
| 3,646,516 | 2/1972 | Flinders et al. | 371/68 |
| 3,937,938 | 2/1976 | Matthews | 371/17 X |
| 4,096,989 | 6/1978 | Tawfik | 371/68 |

FOREIGN PATENT DOCUMENTS

WO81/03078 10/1981 PCT Int'l Appl. ............ 371/17

OTHER PUBLICATIONS

Kellerman and Cesa, "Program Debug Tool for Microprocessors", *IBM Tech. Disc. Bull.*, vol. 20, No. 4, Sep. 1977, p.1358.

Cakaier and Sellier, "Test Device for Microprocessor Programming", *IBM Tech. Disc. Bull.*, vol. 21, No. 10, Mar. 1979, pp. 4076–4077.

Masuda, "Logic Analyzer Aids Efficiency of Digital Devices", *J.E.E.*, vol. 18, No. 178, Oct. 1981, pp. 45–49.

*Primary Examiner*—Larry N. Anagnos
*Assistant Examiner*—David R. Hudspeth
*Attorney, Agent, or Firm*—William A. Linnell; Nicholas Prasinos

[57] ABSTRACT

Apparatus and method for performing a logical not function in a multi-compare environment is disclosed. By performing two equivalence compares of a measured variable against selectable target values and using the result of the equivalence compares to selectivity set or reset a bistable element, the need for inverting and multiplexing the output of a comparator that is otherwise required when performing a NOT equivalence function in a single-compare environment is eliminated. The not function logic is used in a system analyzer connected to a data processing system and is used to selectively enable the tracing of software execution as a function of whether or not a variable is a predefined value.

13 Claims, 2 Drawing Figures

MULTIPLE COMPARISON CIRCUITRY FOR PROVIDING A SOFTWARE ERROR TRACE SIGNAL

RELATED APPLICATIONS

The following patent applications, which are assigned to the same assignee as the instant application, have related subject matter and are incorporated herein by reference.

| TITLE | INVENTORS | SER. NO. |
|---|---|---|
| Data Processing System Common Bus Utilization Detection Logic | Daniel A. Boudreau | 339,551 |
| Data Processing System Auto Address Development Logic For Multiword Fetch | Daniel A. Boudreau | 339,549 |

BACKGROUND OF THE INVENTION

1. Field of the Invention

The apparatus and method of the present invention generally relates to logic circuits and more particularly to a method of performing a logical NOT function by performing multiple comparisons.

2. Description of the Prior Art

Current methods of analyzing the operation of data processing systems include various methods for extracting data or monitoring the performance of the data processing system while in operation. For example, a software analyzer may be connected to the data processing system in order to monitor accesses to a specific memory location, monitor access to a specific peripheral device, monitor the setting of a specific bit within a memory word, monitor the execution of a program at a specific hardware priority level, or perform a trace of the execution of a software program. The software analyzer functions may be performed during the debugging of the system software, for example, in attempting to determine who is inadvertently destroying data in a specified location, or for system a large bulk of time is being spent, so that that particular section of code may be recoded to execute faster.

Typically, a software analyzer has a recording memory which is used to record events which occur during the execution of software in the data processing system which are of interest to the operator of the software analyzer. This recorded data is then simply printed out to provide a trace of the execution of software or it may be further processed by the software analyzer. For example, the software analyzer may calculate the time difference between the occurrence of a beginning event and an ending event or the number events which occur during a lapsed period of time.

In a typical software analyzer, the operator usually has an ability to select which events will be recorded in the trace memory. This ability to select which events will be traced is important because the tracing of all events may obscure the events of interest. For example, if a software analyzer is being used to determine who is destroying a specific location in memory which is written into with a specific value by many instructions within the program, the software analyzer operator can catch the culprit by specifying that tracing is to occur on all operations that write any value other than the specified (correct) value into the specified memory location. For example, if location 100 in a program initially contains a 0 value, which is frequently replaced by a value of 2 being written into it, but is sometime being inadvertently written into with a value other than 2, the software analyzer operator could request that all software instructions which write into location 100 with a value that is not equal to 2 be traced.

Prior art logic to perform the type of operation described above within a software analyzer is shown in FIG. 1. The logic in FIG. 1 is designed to monitor all memory operations and compare the memory address with the address of interest in address comparator 107 and the memory data with the data of interest in the data comparator 132. Depending upon the output of the address and data comparators, the logic sets or resets trace flop 111 such that trace signal TR+ on line 112 will either indicate that the current memory address and data should be recorded in the trace memory or not recorded.

The logic in FIG. 1 used to generate trace signal IR+ on line 112 operates as follows. Prior, or during the course of execution of the software which is to be analyzed, the trace address register 105, trace condition register 116, trace data register 127 and trace data mask register 130 are loaded with information which is to be used as a trigger point to either initiate or stop the tracing of the software execution. Trace address register 105 is loaded with the address of the memory location whose contents is to be monitored. This memory address may be specified by the software analyzer operator, and at some point in time would be available on lines 104 such that it could be latched into trace address register 105 and be continuously available at the outputs thereof, signals TA+ on lines 106 during the execution of the software. Continuing with the above example, signals on line 104 representing the value of address 100 would be latched into trace address register 105.

Similarly, prior to or during the execution of the software to be analyzed, trace data register 127 is loaded with the data of interest from lines 126 such that the data value will be continuously available at the outputs thereof, signals TD+ on lines 128. In a similar manner, trace data mask register 130 is loaded with a mask value from lines 129 such that the trace data mask will be available as signals TDM+ on lines 131 at the outputs thereof during the execution of the software to be analyzed. Continuing with the above example, trace data register 127 would be initially loaded with a data value of 2 from lines 126 and trace mask register 130 would be initially loaded with an all binary ONE's value such that all bits within the memory word would be analyzed and none of them would be ignored as "don't care" conditions.

Similarly, trace condition register 116 would be loaded either prior to or during the execution of the software. Trace condition register 116 is loaded such that when the address and data value on interest is detected, either the trace flop 111 can be set by initially loaded a binary ONE from line 113 into the set flop such that the output there, signal SE+ on line 117, will be a binary ONE, or it can be conditioned to reset when the address and data is detected by loading a binary ONE from line 114 into the reset flop such that the output thereof, signal RE+ on line 118, will be a binary ONE. In addition, the NOT flop of trace condition register 116 is loaded with the signal which is present on line 115 such that the output thereof, signal NC+ on line 119, will determine whether the setting or resetting specified in the set flop or the reset flop is to occur when the memory data is equal, or when the memory data is not equal.

Continuing the above example, if we wish to trace all memory operations up to the point in time when a value other than 2 is stored into location 100, thereby saving within the trace memory the memory operations which preceded the storing of the non-2 value into location 100, we would set trace condition register 116 such that the output of the set flop (or bit) would be a binary ZERO, the output of the reset flop (or bit) would be a binary ONE, and the output of the NOT flop (or bit) would be a binary ONE, thereby specifying that when the data is not equal to 2, the trace flop 111 will be reset. To complete the initiation of the logic in FIG. 1 for the example being discussed, trace flop 111 must also be initially set by applying a binary ONE signal on line 110 which is an input to the set (S) input of trace flop 111 such that the output thereof, signal TR+ on line 112, will initially be a binary ONE.

Having established the initial trace conditions within the logic of FIG. 1, the execution of the software can be initiated or allowed to continue and the software analyzer can begin to function. During each memory operation, when the address of the memory location being accessed becomes available on lines 101, it is latched into execution address register 102 such that it will be continually available as signals EA+ on lines 103. With the execution address available on lines 103 at the A input of address comparator 107 and the trace address on lines 106 available at the B inputs of address comparator 107, the output thereof, signal EQA+, on line 108 will be a binary ONE if the execution address equals the trace address and a binary ZERO if the execution address does not equal the trace address.

At the appropriate moment during a memory operation, when the data being written into the addressed memory location, or the data being read from the addressed memory location, becomes available on lines 123, it is latched into execution address register 124 such that it is continuously available at the outputs thereof as signals ED+ on lines 125. Data comparator 132 compares the execution data on lines 125 at its A inputs with the trace data on lines 128 at its B inputs, masked with the trace data mask available on lines 131 at its X inputs. If each A input bit is equal to the corresponding B input bit has a binary ONE in the corresponding data mask bit at the X inputs, comparator 132 produces a binary ONE at its output as signal EQ+ on line 133. For each corresponding A and B input of data comparator 132 which has a binary ZERO in the corresponding data mask bit at its X inputs, the data comparator makes no comparison between the A and B input bits which are treated as "don't care" bits and therefore do not effect the output of comparator 132.

NOT multiplexer 136 is used to select between the output of data comparator 132 or the inverted output of data comparator 132 as a function of the binary value of the NOT bit from trace condition register 116 which appears as signal NC+ on line 119 at the select (S) input of multiplexer 136. If the NOT bit is a binary ZERO, NOT multiplexer 136 will gate signal EQ+ on line 133 at its 0 input onto its output as signal EQD+ on line 137. If the NOT bit in trace condition register 116 is a binary ONE, NOT multiplexer 136 will gate the inverted output of data comparator 132, signal NEQ+ on line 135, which is the output of inverter 134, at the 1 input of NOT multiplexer 136 onto its output as signal EQD+ on line 137. Thus, signal EQD+ on line 137 will be a binary ONE when the NOT bit of trace condition register is a binary ZERO and the execution data equals the trace data as masked according to the data mask. And it will also be a binary ONE when the execution data does not equal the trace data when the NOT bit is a binary ONE. Signal EQD+ on line 137 will be binary ZERO for all other conditions.

Both the equal address signal EQA+ on line 108 and the equal data signal EQD+ on line 137 are input into set AND gate 109 and reset AND gate 120. In addition, clocking signal CLK+ on line 122 is input to both AND gates 109 and 120. The fourth input to set AND gate 109 is the output of the set bit of trace condition register 116, signal SE+ on line 117. The fourth input of reset AND gate 120 is the output of the reset bit of trace condition register 116, signal RE+ on line 118.

Once each memory operation, at the appropriate moment, clocking signal CLK+ on line 122 transitions from the binary ZERO state to the binary ONE state thus partially enabling AND gates 109 and 120. At this time, the output of set AND gate 109, set flop signal SF+ on line 110 will become a binary ONE if the equal address signal EQA+ on line 108 is a binary ONE and the equal data signal EQD+ on line 137 is a binary ONE and the set bit in trace condition register 116 is a binary ONE. Alternatively, at this time, the output of reset AND gate 120, reset flop signal RF+ on line 121 will become a binary ONE is the equal address signal EQA+ on line 108 and the equal data signal EQD+ on line 137 are binary ONE's and the reset bit in trace condition register 116 is a binary ONE. If both the equal adress signal and the equal data signal on lines 108 and 137, respectively, are not both binary ONE's, or if neither the set bit nor the reset bit in trace condition register is a binary ONE, neither the set flop signal SF+ on line 110, nor the reset flop signal RF+ on line 121 will become a binary ONE.

As discussed previously, when the set flop signal on line 110 at the S input at the trace flop 111 becomes a binary ONE, the output of trace flop 111 signal TR+ on line 112 will become or remain a binary ONE. Conversely, if trace flop 111 is already set, the occurrence of a binary ONE at its reset (R) input by signal RF+ becoming a binary ONE on line 121 will cause trace flop 111 to reset and make the output thereof signal TR+ on line 112 a binary ZERO. Completing the above example, it can be appreciated that when the execution address register 102 contains a value of 100, and when execution data register 124 contains a value other than 2, the output of reset AND gate 120 will become a binary ONE and thus reset trace flop 111 making its output signal TR+ on line 112 a binary ZERO and inhibit the further tracing of the memory operations thereby saving in the trace memory all memory operations up to the point where the memory operation of interest occurred.

Although the prior art logic illustrated in FIG. 1 functions well to the extend that it allows one comparison to be performed per memory operation, there are cases in which it is desirable for a software analyzer to be able to perform more than one comparison per memory operation. Therefore, what is needed is a logic design which permits multiple compares to be made without exceeding the total elapsed time of a memory operation.

OBJECTS OF THE INVENTION

Accordingly, it is an object of the present invention to provide a logic design that permits multiple compares to be made with reduced propagation delay.

It is another object of the present invention to provide a logic design that permits a not equal function to be performed without requiring the inversion and multiplexing of the output of an equal comparator.

It is a still further object of the present invention to provide a low cost not equal function.

This invention is pointed out with particularity in the appended claims. An understanding of the above and further objects and advantages of this invention can be obtained by referring to the following description taken in conjunction with the drawings.

SUMMARY OF THE INVENTION

Briefly described, the invention is a method for performing a logical NOT equivalence function between two variables by unconditionally setting a bistable element to a first state during a first comparison without regard to whether or not the two variables are equivalent and to setting the bistable element to a second state during a second comparison if the two variables are equivalent whereby upon completion of the second comparison the bistable element will be in the second state if the two variables are equal and will be in the first state if the two variables are not equal. The invention when embodied in an apparatus for performing a logical NOT equivalence function comprises a bistable means connected to a comparator means via a control means such that the comparator produces a signal indicating whether or not two variables are equal with the output of the comparator means being used to set the bistable element to a first state during a first comparison and to set the bistable element to a second state during a second comparison if the two variables presented to the comparator are equivalent. The control means includes apparatus for selecting the inputs to the comparator such that during the first comparison the output of the comparator will unconditionally indicate equivalence. In the preferred embodiment, the comparator has a third input which provides for the masking of the two variables thereby allowing the comparator to unconditionally indicate equivalence during the first comparison by using a mask that effectively results in no comparison being made between the two variables.

BRIEF DESCRIPTION OF THE DRAWINGS

The manner in which the method of the present invention is performed and the manner in which the apparatus of the present invention is constructed and its mode of operation can best be understood in light of the following detailed description together with the accompanying drawings in which like reference numbers identify like elements in the several figures and in which.

DESCRIPTION OF THE PREFERRED EMBODIMENT

Figure 1:
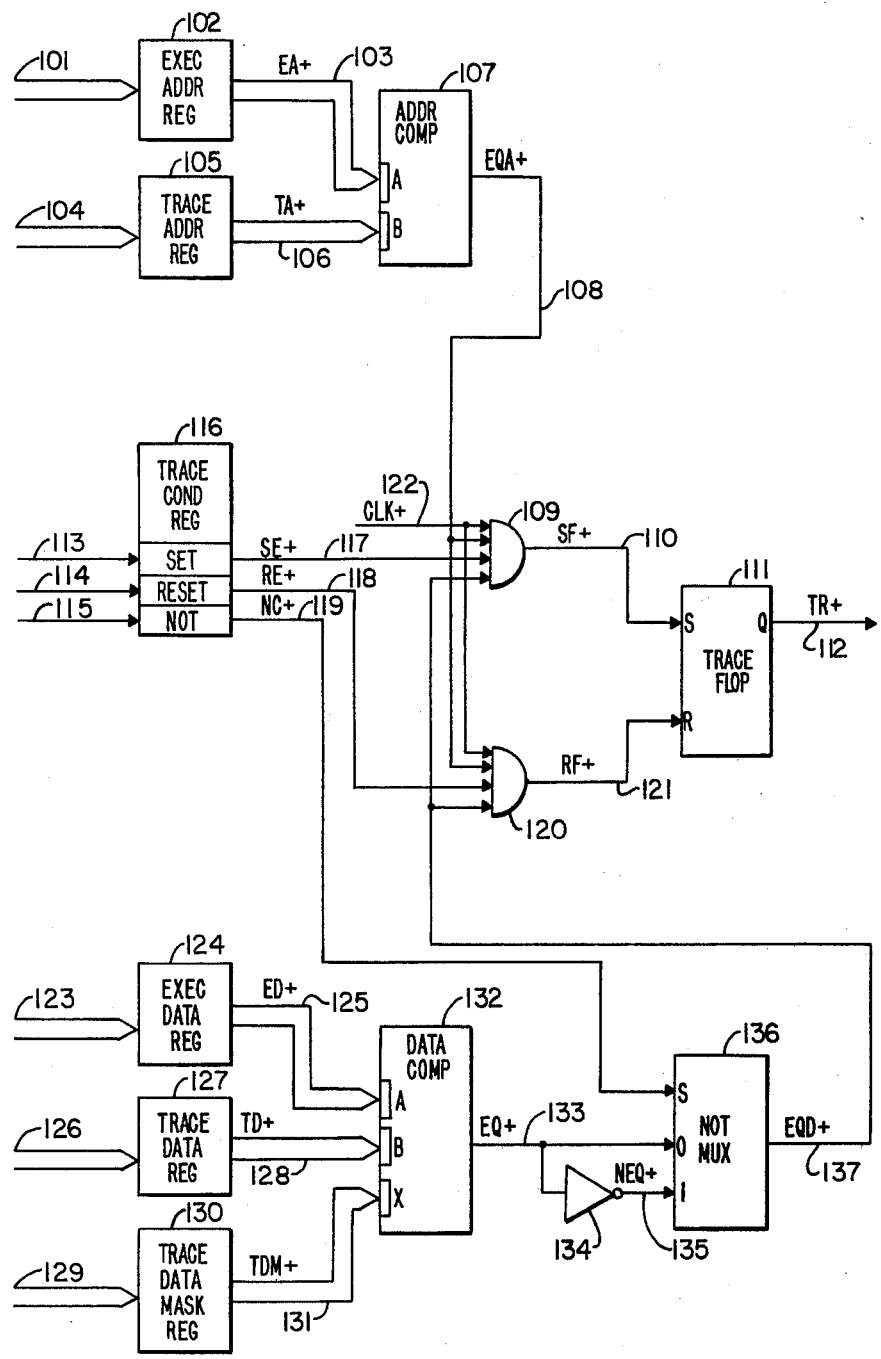
FIG. 1 illustrates the logic of a prior art circuit for performing a NOT function in a single compare environment.
Figure 2:
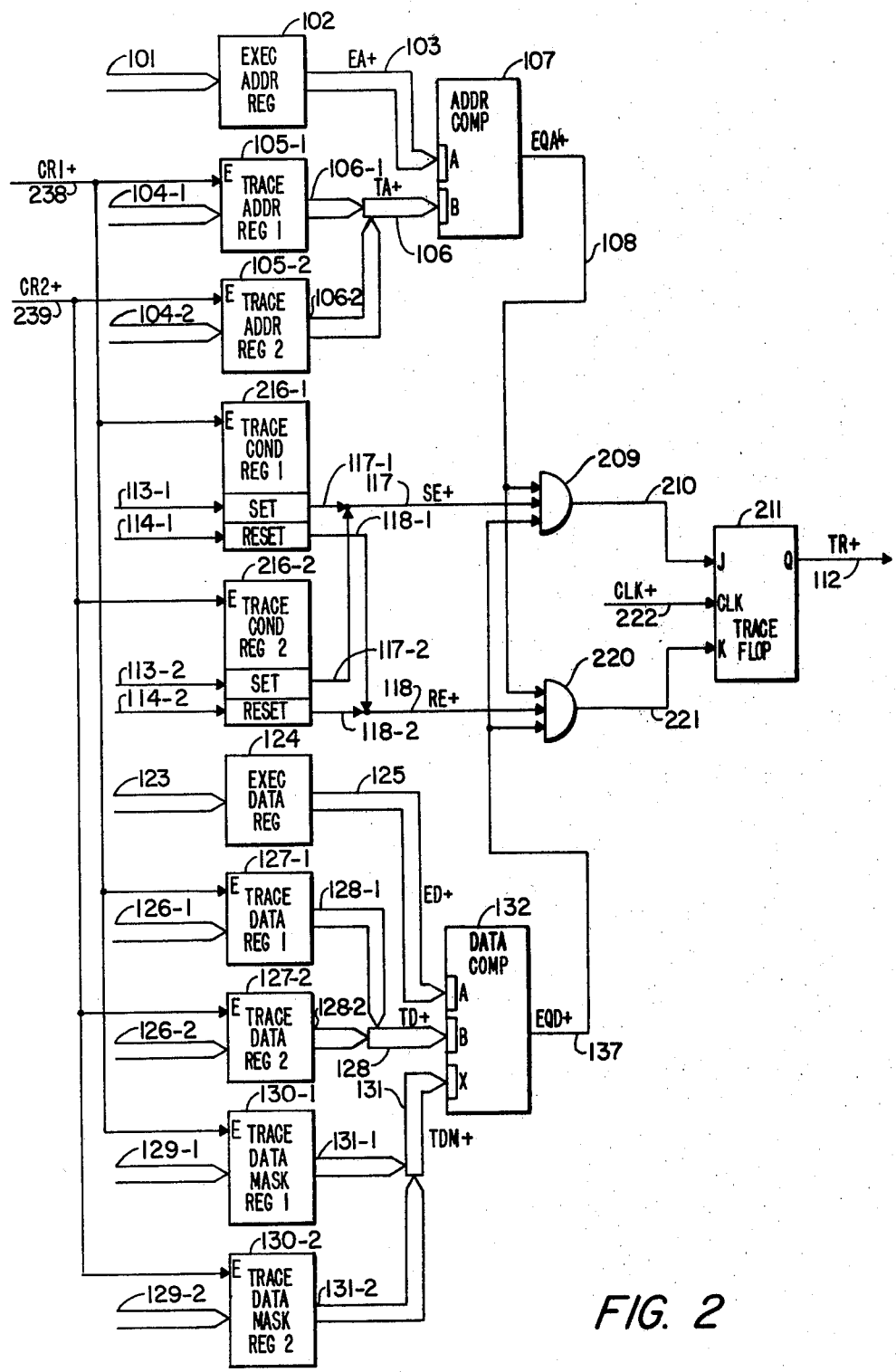
FIG. 2 illustrates the logic of the present invention for performing a NOT function in a multi compare environment.

FIG. 2 illustrates logic within a software analyzer which incorporates the present invention to perform the type of operation described above. As in FIG. 1, the logic in FIG. 2 is designed to monitor all memory operations and compare the memory address with the address of interest using memory comparator 107 and the memory data with the data of interest using data comparator 132. Depending upon the outputs of the address and data comparators, the logic either sets or resets trace flop 211 such that the trace signal TR+ on line 112 will either indicate that the current memory address and data should be recorded in the trace memory or not recorded.

Although the logic in FIG. 2 operates in a manner similar to that in FIG. 1 in that address comparator 107 compares the execution address with the trace address and data comparator 132 compares the execution data with the trace data, there are differences particularly in the manner in which a NOT equivalence function is performed. In FIG. 2 instead of doing a single compare per memory operation as was done in the prior art logic illustrated in FIG. 1, multiple compares are performed per memory operation with each compare having its own trace address, trace conditions, trace data and trace data mask. Thus in FIG. 2, which illustrates the minimal case of having two sets of trace registers, two comparisons are performed per memory operation.

Prior, or during the course of execution of the software which is to be analyzed, the trace address register 1 105-1, trace condition register 1 216-1, trace data register 1 127-1, and trace data mask register 1 130-1 are loaded with information which is to be used as a trigger point to either initiate or stop the tracing of the software execution by latching data presented to their inputs from lines 104-1, 113-1, 114-1, 126-1 and 129-1 respectively. In a similar manner, trace address register 2, 105-2, trace condition register 2 216-2, trace data register 2 127-2 and trace data mask register 2 130-2 are loaded with the information at their inputs from lines 104-2, 113-2, 114-2, a 126-2 and 129-2 respectively.

Once the information has been latched into trace registers 1 (105-1, 216-1, 127-1 and 130-1) and trace registers 2 (105-2, 216-2, 127-2 and 130-2), it is selectively enabled at the outputs thereof by compare registers 1 signal CR1+ on line 238 and compare registers 2 signal CR2+ on line 239 which selectively go to the enable (E) inputs of trace registers 1 and trace registers 2. Thus, during the first compare of the two compares which are performed per memory operations, during the period of time the compare register 1 signal CR1+ is a binary ONE, trace information in trace address register 1 is available on lines 106-1, the trace conditions in trace condition register 1 216-1 are available on lines 117-1 and 118-1, the trace data in trace data register 1 127-1 is available on lines 128-1 and the trace data mask in trace data mask register 1 130-1 is available on lines 131-1. Similarly, during the second compare performed during a memory operation during the time the compare registers 2 signal CR2+ is a binary ONE, the trace address is available on lines 106-2, the trace conditions on lines 117-2 and 118-2, the trace data on lines 128-2 and the trace data mask on lines 131-2.

Thus, during the first compare, the trace address signal TA+ on line 106 originates from trace registers 1 the set equal signal SE+ on line 117 and the reset equal signal RE+ on line 118 originate from trace registers 1, the trace data signals TD+ on lines 128 and the trace data mask signal TDM+ on lines 131 originate from trace registers 1 and during the second compare these signals originate from trace registers 2.

During the first compare, the execution address from execution address register 102 is compared with the trace address from trace address register 1 105-1 at the same time that the execution data from execution data register 124 is compared with the trace data from trace data register 1 127-1 as masked by trace data mask from trace data mask register 1 130-1. The outputs of address comparator 107, signal EQA+ on line 108, and data comparator 132, signal EQD+ on line 137, are both input to set AND gate 209 and reset AND gate 220. The third input to set AND gate 209 is the set equal signal SE+ on line 117 and the third input to reset AND gate 220 is the reset equal signal RE+ on line 118.

After the outputs of trace register 1 have been enabled such that the signals at their outputs are stable and the outputs of comparator 107 and data comparator 132 and the outputs of set AND gate 209 and reset AND gate 220 have become stable, the trace flop 211 is clocked by clocking signal CLK+ on line 222 at its clock (CLK) input transitioning from a binary ZERO to a binary ONE state. Trace flop 211 is a J-K flip-flop such that if a binary ONE is at its J input when it is clocked the flop will be set and a binary ONE will appear at its output (Q). Conversely, if a binary ONE is at its K input when clocked, the flip-flop will be reset and a binary ZERO will appear at its output. In the preferred embodiment, J-K trace flop 211 is of the type SN74S112, manufactured by Texas Instruments Incorporated of Dallas, Tex., and is described in the publication entitled, *The TTL Data Book for Design Engineers*, Second Edition, copyrighted 1976, which is incorporated herein by reference.

During the second compare, trace registers 1 are disabled such that no signal will appear at their outputs and trace registers 2 are enabled such that the trace address, trace conditions, trace data and trace data mask will appear at their outputs. After the outputs of set AND gate 209 and reset AND gate 220 have become stable, trace flop 211 is again clocked by clocking signal CLK+ transitioning from the binary ZERO to the binary ONE state and the flip-flop will be set or reset depending upon the signals at the J and K inputs thereof.

To perform a set on NOT equal data operation (i.e., set flip-flop 211 if any value other than a specified data value is stored in or read from a specified memory location) using the logic of FIG. 2, the trace registers 1 are initialized to set trace flop 211 if the execution address and trace address are equal (while ignoring the data) during the first comparison and trace registers 2 are initialized to reset trace flop 211 during the second comparison if both the execution address and trace address are equal and the execution data and trace data are equal. This amounts to a set on NOT equal data operation. To perform a reset on NOT equal data operation (i.e., reset flip-flop 211 if any value other than a specified value is stored in or read from a specified memory location), trace registers 1 are initialized to reset trace flop 211 during the first comparison if both the execution address and trace address are equal (while ignoring the data) during the first comparison and trace registers 2 are initialized to set trace flop 211 during the second comparison if both the execution address and trace address are equal and the execution data and trace data are equal.

For example, using the same example used earlier with respect to the prior art logic in FIG. 1, if we wish to trace all memory operations up to the point in time where somebody stores a value other than 2 into location 100, thereby saving within the trace memory the memory operations which precede the storing of the non-2 value into location 100, we would initialize trace registers 1 and trace registers 2 such that a value equaling address 100 would be latched into trace address register 1 105-1, a binary ZERO would be latched into the set bit and a binary ONE would be latched into the reset bit of trace condition register 1 216-1 and a mask of all binary ZERO's would be latched into trace data mask register 2 130-1. Trace data register 1 127-1 can have any value latched into it because the all binary ZERO's mask in trace data mask register 1 130-1 effectively means that the trace data is a "don't care" condition during the first comparison. Trace registers 2 are initialized such that a value equaling address 100 is latched into trace address register 2 105-2, a binary ONE is latched into the set bit and a binary ZERO is latched into the reset bit of trace condition register 2 216-2, a value corresponding to a data value of 2 is latched into trace data register 2 127-2 and a mask of all binary ONE's is latched into trace data mask register 2 130-2. To complete the initialization of the logic of FIG. 2 for the example being discussed, trace flop 211 must also be initially set by applying a binary ONE value on line 210 which is input to the J input and clocking the flop by transitioning clocking signal CLK+ on line 222 from the binary ZERO to the binary ONE state thus making the signal at the output thereof, signal TR+ on line 112, initially a binary ONE.

Having established initial trace conditions within the logic of FIG. 2, the execution of the software can be initiated or allowed to continue and the software analyzer can begin to function. During each memory operation when the address of the memory location becomes available on lines 101, it is latched into execution address register 102 such that it will be continually available at the outputs thereof as signal EA+ on lines 103 and when the data to or from memory becomes available on lines 123 it is latched in execution data register 124 such that it is continuously available at the outputs thereof as signals ED+ on lines 125. After the both the execution address and the execution data have been latched into execution address register 102 and execution address data registers 124, respectively, the outputs of trace registers 1 are enabled by signal CR1+ becoming a binary ONE at their enable (E) inputs thus making available the first trace address on lines 106-1 and which becomes signals TA+ on lines 106 at the B inputs of address comparator 107. At the same time, the first trace data becomes available on lines 128-1 and which becomes signals TD+ on lines 128 at the B inputs of data comparator 132 and the first trace data mask becomes available on lines 131-1 and which becomes as signals TDM+ on lines 131 at the X inputs of data comparator 132. In addition, at this time the set bit and the reset bits become available on lines 117-1 and 118-1 which in turn become signals SE+ on line 117 and RE+ on line 118 which specify the first group of trace conditions.

After these signals have propagated through address comparator 107 and data comparator 132, all inputs to set AND gate 209 and reset AND gate 220 become stable and the outputs thereof on lines 210 and 221, respectively, become valid. At this time, trace flop 211 is clocked by clocking signal CLK+ on line 122 transitioning from the binary ZERO to the binary ONE state which will result in the setting or resetting of trace flop 211 if either the set bit or reset bit were a binary ONE and both the equal address signal EQA+ on line 108 and the equal data signal EQD+ on line 137 were both a binary ONE. Alternatively, if neither the set bit nor the reset bit were a binary ONE, or if both the signals EQA+ and EQD+ were not both binary ONE's, no change in the state of trace flop 211 will result from its being clocked. Upon completion of the first comparison, signal CR1+ becomes a binary ZERO disabling the outputs trace registers 1 and signal CR2+ becomes a binary ONE enabling the outputs of trace registers 2. After the outputs of trace registers 2 have become stable at the inputs of address comparator 107 and data comparator 132, and allowing for propagation time through comparators 107 and 137, such that all inputs to AND gates 209 and 220 become stable and the signals propagate therethrough, the trace flop 211 is again clocked by clocking signal CLK+ transitioning from the binary ZERO to the binary ONE state and the outputs of the second comparison can result in the setting, the resetting, or no change in trace flop 211.

Returning now to the above example in which trace registers 1 and 2 were initialized to reset trace flop 211 whenever a value other than 2 is stored in memory location 100. This example will be discussed using the three cases (1) the value 8 (not equal to 2) is stored in location 100, (2) the value 2 is stored in location 100, and (3) a value 10 is stored in location 300. The first case, in which the value 8 is stored in location 100 should result in the resetting of trace flop 211 at the end of the memory operation. In this case, during the first comparison, both the A and B inputs of address comparator 107 will be 100 and the output thereof, signal EQA+ on line 108, will therefore be a binary ONE. During this first comparison, a value of 8 will be available at the A inputs of data comparator 132 and the "don't care" data will be available at the B inputs and the all binary ZERO's mask will be available at the X inputs. Therefore, data comparator 132 will output a binary ONE for signal EQD+ on line 136 because all of the A input bits are equal to their corresponding B input bits which are of interest as indicated by the data mask (the X inputs) which have a corresponding binary ONE. In this particular case, there are no bits of interest.

As stated above, trace condition register 1 was initialized such that the set bit was a binary ZERO and the reset bit was a binary ONE such that signal SE+ on line 117 will be a binary ZERO and signal RE+ on line 118 will be a binary ONE. With both signals EQA+ and EQD+ being binary ONE's at the inputs of AND gates 209 and 220, the output of set AND gate 209 will be a binary ZERO because signal SE+ is a binary ZERO and the output of reset AND gate will be a binary ONE because signal RE+ is a binary ONE. Therefore, during the first comparison, when trace flop 211 is clocked by clocking signal CLK+ transitioning from a binary ZERO to the binary ONE, the trace flop 211 will be reset from its set condition and signal TR+ on line 112 will become a binary ZERO. Thus, at the end of the first comparison with the address in execution address register 102 is equal to 100, we can see that trace flop 211 is reset irrespective of the value of the data in execution data register 124.

During the second comparison, trace address register 2 will again present a value of 100 to the B inputs of address comparator 107 making the output thereof, signal EQA+, again a binary ONE. During the second comparison, the output of trace data register 2 will make the value of 8 available at the B inputs and the all binary ONE's mask available at the X inputs of data comparator 132 which will then compare the value of 2 at the A inputs with the value of 8 at its B inputs and produce a binary ZERO at its output as signal EQD+ on line 137. With signal EQD+ being a binary ZERO as an input to both AND gates 209 and 220, the outputs thereof on lines 210 and 221 respectively will both be binary ZERO's such that when trace flop 221 is clocked by clocking signal CLK+ again transitioning from the binary ZERO to the binary ONE state, the output of the trace flop 211 will not be affected and signal TR+ will remain a binary ZERO. Thus, at the end of the second comparison, trace flop 211 which was initially set is now in the reset condition which occurred during the first comparison and remained unchanged during the second comparison.

Taking now the second case in which the value of 2 is stored in the memory location 100 which should result in no change in the status of trace flop 211 from its original set condition. During the first comparison, as seen above, in which the execution address equals the trace address and in which the execution data is a "don't care" condition, the output of address comparator 107 and data comparator 132 will both be binary ONE's and result in the trace flop 211 being reset by the clocking of the binary ONE at the output of reset AND gate 220 into the J-K flop by clocking signal CLK+ transitioning from the binary ZERO to the binary ONE state. During the second comparison, the execution address at the A inputs is again equal to the trace address at the B inputs of address comparator 107 because both the A and B inputs will be 100, thereby making its output signal EQA+ a binary ONE. During the same second comparison, the execution data at the A inputs of data comparator 132 will equal the trace data from register 2 at the B inputs as masked by the all binary ONE's mask at the X inputs and thereby make the output of data comparator 132, signal EQD+ on line 137, also a binary ONE. During the second comparison, the trace conditions in trace condition register 2 216-2 are such that signal SE+ on line 117 will be a binary ONE and signal RE+ on line 118 will be a binary ZERO such that the output of set AND gate 209 on line 210 will be a binary ONE and the output of reset AND gate 220 on line 221 will be a binary ZERO. Therefore, during the second comparison, when trace flop 211 is clocked by clocking signal CLK+ transitioning from the binary ZERO to the binary ONE state, trace flop 211 will be set such that the output thereof, signal TR+ on line 212, will be a binary ONE. Therefore, at the end of this memory operation in which a value of 2 is stored into location 100, we have seen that trace flop 211 was initially reset during the first comparison but was subsequently set during the second comparison such that its state at the end of the memory operation remains set. This is the same state that it was before the memory operation.

Taking now the third case in which the value 10 is stored in memory location 300, it can easily be seen that during both the first and second compare cycles the execution address of 300 at the A inputs of address comparator 107 will be compared with the trace address of 100 at the B inputs and therefore the output of address comparator 107, signal EQA+ on line 108, will be a binary ZERO during both the first and second comparisons. Because signal EQA+ on line 108 is an input to both AND gates 209 and 220, the outputs thereof on lines 210 and 221, respectively, will be binary ZERO's for both the first and second comparisons such that trace flop 211 will not be affected by either the first or second clocking of trace flop 211 such that the output thereof, signal TR+ on line 112, will not be changed during this third case memory operation.

From the above description of the preferred embodiment and discussion of the example cases, it can be appreciated that the NOT function performed by inverter 134 and NOT multiplexer 136 at the output of data comparator 132 and the NOT bit in trace condition register 116 of the logic of FIG. 1 which is utilized in a single comparison mode of operation has been replaced by performing two comparisons with each comparison being done against a different set of trace data and trace data mask along with two sets of trace condition bits. As can be seen from the above discussion, in order to initialize the logic in FIG. 2 to set trace flop 211 on NOT equal data, trace registers 1 are initialized to set the trace flop if the address is equal and the data is a "don't care" condition and trace registers 2 are initialized to reset the trace flop if the address is equal and the data is equal. Conversely, if it is desired to reset trace flop 211 on a NOT equal data condition, trace register 1 is initialized to reset on an equal address with a "don't care" condition for the data during the first comparison and to set on equal address and data during the second comparison. Thus, during a first comparison of a NOT equal data operation, the logic in FIG. 2 is initialized to perform the operation if the address is equal and to do the converse operation during the second comparison when both the address and data are equal.

Although the logic in FIG. 2 shows a trace address register 1 and a trace address register 2, only one trace address register need be provided as is found in the logic in FIG. 1 if only not equal data operations are to be performed. This is because during not equal data operations, trace address register 1 and trace address register 2 are both initialized to the same address value and therefore one register could be used with its outputs continually enabled into the B input of address comparator 107. The providing of multiple trace address registers does have the advantage that the logic in FIG. 2 can be utilized to do two completely independent equal data operations with each operation having a different trace address and trace data value.

For example, it may be desirable during the debugging of a particular program to start the tracing of the software execution whenever any program stores a 5 into location 400 or a 7 into location 600. In this example, trace flop 211 will initially be reset such that the output thereof, signal TR+ on line 112, would be a binary ZERO and trace registers 1 would be initialized such that trace address register 1 contains a value of 400, trace condition register 1 has its set bit equal to a binary ONE and its reset bit equal to a binary ZERO and trace data register 1 contains the value 5 and trace data mask register 1 contains all binary ONE's. Trace registers 2 would be initialized such that trace address register 2 contains a 600, trace condition register 2 has a binary ONE value for the set bit and a binary ZERO value for the reset bit and trace data register 2 contains a 7 and trace data mask register 2 contains all binary ONE's. Once initialized, during each memory operation if a 5 is stored into location 400 or a 7 is stored into location 600 at the end of the memory operation at the completion of the two comparisons, trace flop 211 will be set and its output, signal TR+ on line 112, will be a binary ONE if either of those conditions occurred. Thus, it can be appreciated that the logic of FIG. 2 allows multiple compares to be made during a single memory operation for completely independent data operations and also allows one NOT equal data operation to be performed without requiring the NOT logic found in the logic of FIG. 1. This elimination of the NOT logic found in FIG. 1 reduces the propagation time between the trace register and the trace flop. This permits multiple comparisons to be performed using the logic in FIG. 2 which would not otherwise be possible using the logic in FIG. 1 because of the propagation times increased due to the inverter 134 and NOT multiplexer 136 of FIG. 1. This is particularly important for the relatively fast memory operations which are performed by current computer systems and if multiple comparisons of independent conditions are to be performed during each memory operation.

Although for simplicity, the logic in FIG. 2 has illustrated only two sets of trace registers, this logic is easily extended to a number greater than 2 and in the preferred embodiment four sets of trace registers are used thus allowing two completely independent not equal data operations to be performed during each memory operation.

Although the present invention has been described in terms of a not equal data operation using logic illustrated in FIGS. 1 and 2, the principle of the present invention is easily extended to allow a not equal address operation to be performed by providing for the addition of a trace address mask register, the outputs of which would be fed into X inputs added to address comparator 107.

Although the present invention has been described in terms of a preferred embodiment in which the not equal function is used in a software analyzer in which the not equal function is performed on a pair of variables (the address and data), it will be appreciated by those skilled in the art that the not equal function need not be performed on multiple (grouped) variables and is equally applicable for a single variable. It will be further appreciated by those skilled in the art that the principles of the present invention are equally applicable whether or not the data which is being compared consists of one or more bits of information.

While the invention has been shown and described with reference to the preferred embodiment thereof, it will be understood by those skilled in the art that the above and other changes in form and detail may be made therein without departing from the spirit and cope of the invention.

What is claimed is:

1. A method for performing a logical NOT equivalence function between a first value and a second value comprising the steps of:
   A. performing a first comparison between the first value and the second value;
   B. unconditionally setting a bistable element to a first state after the first comparison without regard as to whether or not the first value is equal to the second value;
   C. performing a second comparison between the first value and the second value; and
   D. setting the bistable element to a second state after the second comparison if the first value is equal to the second value, whereby after the completion of the second comparison the bistable element will be in the second state if the first value is equal to the second value and the bistable element will be in the first state if the first value is not equal to the second value.

2. The method of claim 1 wherein the first value and the second value are comprised of a plurality of bits and wherein said unconditional setting of the bistable element to the first state is performed in response to the output of a maskable comparator indicating that all non-masked first value bits are equal to their corresponding non-masked second value bits.

3. The method of claim 2 wherein a mask having mask bits all of the same logic state is used so that there will be no non-masked bits and the output of the maskable comparator will indicate equivalence between the first value and the second value after the first comparison.

4. The method of claim 2 wherein the first state can be pre-specified to be a binary ZERO and the second state can be specified to be a binary ONE by selecting that the bistable is to be set to a binary ZERO after the first comparison and reset to a binary ONE after the second comparison if the output of the maskable comparator indicates equivalence or wherein the first state can be specified to be a binary ONE and the second state can be specified to be a binary ZERO by specifying that the bistable is to be set to a binary ONE after the first comparison and reset to a binary ZERO after the second comparison if the output of the maskable comparator indicates equivalence.

5. The method of claim 1 wherein the first value is a observed variable and the second value is a selected reference value.

6. The method of claim 1 wherein a third value is substituted for the first value and a fourth value is substituted for the second value during the second comparison providing for two independent equivalence functions to be performed.

7. The method of claim 1 wherein the second comparison is followed by N−1 further comparisons in which an Ith value is compared to the first value, where I is equal to the number of the comparison being performed, whereby N NOT equivalence functions can be performed by making N+1 comparisons.

8. An apparatus for performing a logical NOT equivalence function between a first value and a second value comprising:
  A. bistable means having a first state and a second state;
  B. comparator means having a first input for receiving the first value and a second input for receiving the second value, said comparator means for generating an equal signal at an output, the equal signal being in a first state if the first value is equal to the second value and in a second state if the first value is not equal to the second value; and
  C. control means, a first input of said control means coupled to the output of said comparator means, an output of said control means coupled to said bistable means, said control means for setting said bistable means to the first state during a first comparison if the equal signal output by said comparator means is in the first state and for setting said bistable menas to the second state during a second comparison if the equal signal output by said comparator means is in the first state, whereby at the completion of the second comparison said bistable means will be in the second state if the first value is equal to the second value and said bistable means will be in the first state if the first value is not equal to the second value.

9. The apparatus of claim 8 wherein said comparator means is a maskable comparator.

10. The apparatus of claim 9 wherein said bistable means is a J-K flip-flop.

11. The apparatus of claim 9 wherein said control means comprises two AND gates.

12. An apparatus for controlling the tracing of a program execution comprising:
  A. bistable means having a first state and a second state;
  B. address comparator means having a first input for receiving an execution address value and a second input for receiving a trace address value, said address comparator means for generating an address equal signal at an output, the address equal signal being in a first state if the execution address value is equal to the trace address value and in a second state if the execution address value is not equal to the trace address value;
  C. data comparator means having a first input for receiving an execution data value and a second input for receiving a trace data value, said data comparator means for generating a data equal signal at an output, the data equal signal being in a first state if the execution data value is equal to the trace data value and in a second state if the execution data value is not equal to the trace data value; and
  D. control means, a first input of said control means coupled to the output of said address comparator means, a second input of said control means coupled to the output of said data comparator means, an output of said control means coupled to said bistable means, said control means for setting said bistable means to the first state during a first comparison if the address equal signal output by said address comparator means is in the first state and for setting said bistable means to the second state during a second comparison if the address equal signal output by said address comparator means is in the first state and if the data equal signal output by said data comparator means is in the first state, whereby at the completion of the second comparison said bistable means will be in the second state if the execution address value is equal to the trace address value and the execution data value is equal to the trace data value and said bistable means will be in the first state if the execution address value is equal to the trace address value and the execution data value is not equal to the trace data value.

13. The apparatus of claim 12 wherein said data comparator means is a maskable comparator.

* * * * *